(12) United States Patent
Peter

(10) Patent No.: US 7,644,763 B2
(45) Date of Patent: Jan. 12, 2010

(54) DOWNHOLE CUTTING TOOL AND METHOD

(75) Inventor: Andreas Peter, Celle Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 214 days.

(21) Appl. No.: 11/690,925

(22) Filed: Mar. 26, 2007

(65) Prior Publication Data

US 2008/0236893 A1 Oct. 2, 2008

(51) Int. Cl.
    *E21B 43/11* (2006.01)
(52) U.S. Cl. .................. 166/298; 166/55.7; 166/55.8
(58) Field of Classification Search .............. 166/298, 166/55, 55.1, 55.7, 55.8
    See application file for complete search history.

(56) References Cited

U.S. PATENT DOCUMENTS

| | | | |
|---|---|---|---|
| 2,905,247 A * | 9/1959 | Vestermark ................. | 166/100 |
| 3,783,721 A | 1/1974 | Miller | |
| 3,983,936 A | 10/1976 | Kennard et al. | |
| 4,068,711 A | 1/1978 | Aulenbacher | |
| 4,220,201 A | 9/1980 | Hauk | |
| 4,369,573 A * | 1/1983 | Vitale ......................... | 30/105 |
| 4,550,781 A | 11/1985 | Kagler | |
| 4,646,826 A | 3/1987 | Bailey et al. | |
| 4,703,802 A | 11/1987 | Bryan et al. | |
| 4,776,394 A | 10/1988 | Lynde et al. | |
| 4,809,775 A | 3/1989 | Fortin | |
| 4,887,668 A | 12/1989 | Lynde et al. | |
| 4,938,291 A | 7/1990 | Lynde et al. | |
| 5,085,113 A * | 2/1992 | Pinney ........................ | 83/840 |
| 5,201,817 A | 4/1993 | Hailey | |
| 5,253,710 A | 10/1993 | Carter et al. | |
| 5,287,920 A | 2/1994 | Terrell | |
| 5,456,312 A | 10/1995 | Lynde et al. | |
| 5,692,565 A * | 12/1997 | MacDougall et al. ........ | 166/264 |
| 5,732,770 A | 3/1998 | Beeeman | |
| 5,791,409 A | 8/1998 | Flanders | |
| 5,810,079 A | 9/1998 | Lynde et al. | |
| 5,823,255 A | 10/1998 | Swiatovy et al. | |
| 5,833,021 A * | 11/1998 | Mensa-Wilmot et al. .... | 175/433 |
| 5,899,268 A | 5/1999 | Lynde et al. | |
| 6,029,745 A | 2/2000 | Broussard et al. | |
| 6,125,929 A | 10/2000 | Davis et al. | |
| 6,357,528 B1 | 3/2002 | Davis et al. | |
| 6,626,074 B1 | 9/2003 | Wheeler | |
| 6,629,565 B2 | 10/2003 | Harrell | |
| 6,679,328 B2 | 1/2004 | Davis | |
| 6,691,596 B1 | 2/2004 | Singh et al. | |
| 6,868,901 B2 * | 3/2005 | Mason et al. ............... | 166/55.7 |
| 6,899,181 B2 | 5/2005 | Simpson et al. | |
| 6,920,923 B1 | 7/2005 | Pietrobelli et al. | |
| 2002/0150436 A1 | 10/2002 | Mason et al. | |

OTHER PUBLICATIONS

International Search Report with Written Opinion, PCT/US2008/057512, Date Mailed Aug. 19, 2008.

(Continued)

*Primary Examiner*—Giovanna C Wright
(74) *Attorney, Agent, or Firm*—Cantor Colburn LLP

(57) ABSTRACT

Disclosed herein is a downhole cutting tool. The downhole cutting tool including, a cutting member mounted on a rotatable shaft, a shaft-deflecting device in operable communication with the shaft, and a motor in operable communication with the shaft.

31 Claims, 3 Drawing Sheets

OTHER PUBLICATIONS

"Cutting Tools Provides Safe, Clean Cuts in Downhole Tubulars," Journal of Petroleum Technology Online, Facilities (PFC) Jun. 19, 2008. 1 page.

"Pipe Recovery Brochure," Sondex Wireline. SON-7658, Jan. 2008. 20 pages.

* cited by examiner

DOWNHOLE CUTTING TOOL AND METHOD

BACKGROUND OF THE INVENTION

For a variety of reasons there are occasions when tubular structures such as casings and production tubing, for example, positioned downhole in wellbores need to be cut.

Cutters have been developed that have rotating portions with knives that are pivoted radially outwardly to engage the inner surface of the tubular structure to perform a cut. Such cutters are susceptible to heavy vibrations due to such things as lack of control of cutting depth engagement of the knives with the surface being cut. Additionally, sealing of motors and gears within such cutters is difficult due to the size and configuration of each cutter's rotating components.

Accordingly, the art is in need of a cutting tool that facilitates sealing of motors and gears from a downhole environment. Additionally the art is in need of cutting tools with improved cutting depth control while limiting vibrational amplitudes during the cutting process.

BRIEF DESCRIPTION OF THE INVENTION

Disclosed herein is a downhole cutting tool. The downhole cutting tool including, a cutting member mounted on a rotatable shaft, a shaft-deflecting device in operable communication with the shaft, and a motor in operable communication with the shaft.

Further disclosed herein is a method of cutting a downhole tubular structure. The method including, inserting a cutting tool into a downhole tubular structure and rotating a shaft of the cutting tool with a cutting member attached thereto. The method further including, deflecting the shaft with a shaft-deflecting device to thereby laterally deflect the cutting member to cuttingly engage a tubular structure, and rotating the shaft-deflecting device at least one complete revolution.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of several embodiments of the disclosed apparatus and method are presented herein by way of exemplification and not limitation with reference to the Figures.

Figure 1:
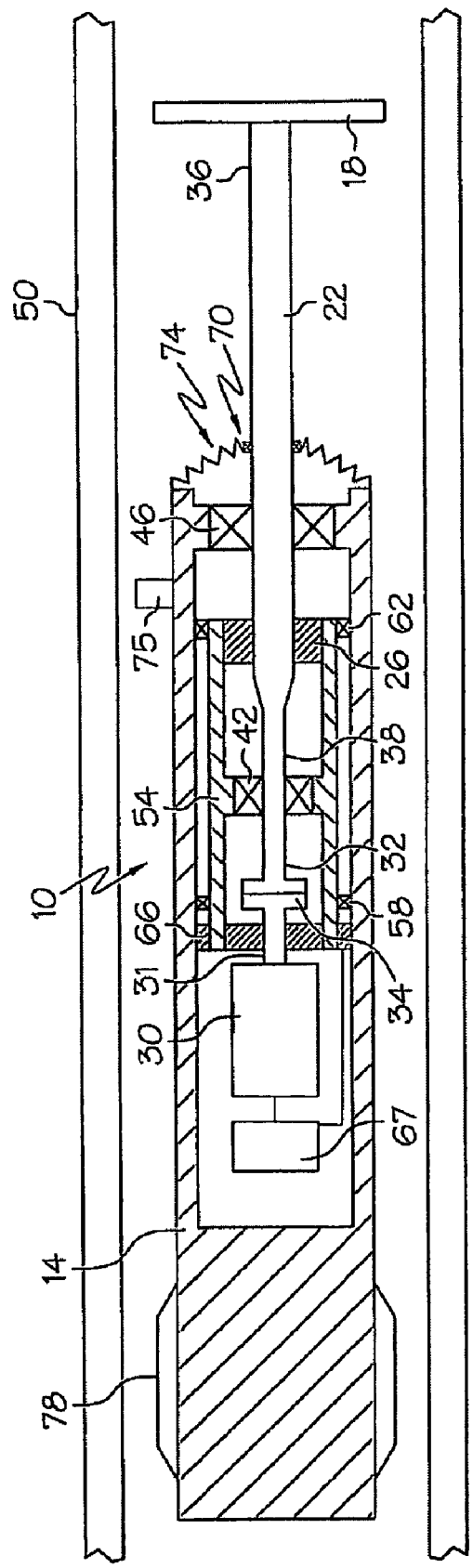
FIG. 1 depicts a cross sectional view of a downhole cutting tool disclosed herein.

Referring to FIG. 1 an embodiment of the downhole cutting tool 10 is illustrated. The downhole cutting tool 10 includes a housing 14, a cutting member 18, a rotatable shaft 22, a shaft-deflecting device 26 and a motor 30. In one embodiment, the housing 14 is filled with a nonconductive fluid such as oil. The motor 30 can be an electric motor, hydraulic motor, or any other rotational drive device to suit the application. The motor 30 has an output-rod 31 that is coupled to a first end 32 of the shaft 22 through a clutch 34 that transmits the rotation of the motor 30 to the shaft 22. The cutting member 18 comprises a cutting or abrasive implement such as a disc mill, a grinding disc or a cutting disc, for example that is fixed to a second end 36 of the shaft 22 and therefore rotates with the rotation of the shaft 22. The shaft 22 (shown in FIG. 1 in a non-deflected state) is deflectable, by the shaft-deflecting device 26, such that a portion 38 of the shaft 22 located between a first bearing 42 and a second bearing 46 is deflected laterally compared to a centerline through the bearings 42, 46. Such a lateral deflection causes the ends 32 and 36 to deflect laterally in a direction opposite to a direction in which the portion 38 is deflected. It is this lateral deflection of the second end 36, to which the cutting member 18 is attached, that results in the cutting member 18 contacting an inner dimension of a tubular structure 50 and to thereby cut into the tubular structure 50.

Since, as mentioned above, the first end 32 of the shaft 22 deflects laterally the clutch 34 needs to be constructed to accommodate this lateral deflection of the first end 32 while still transmitting the rotation of the motor 30 to the shaft 22. Additionally, the bearings 42 and 46 must be able to accommodate the shaft 22 passing therethrough at angles that result from the deflection of the shaft 22. Spherical ball or spherical roller bearings, for example, could be used for the bearings 42 and 46 since they allow for the shaft 22 to pass through the bearings 42, 46 at various angles. The need to accommodate the shaft at various angles, as opposed to just a single angle, will become apparent below.

The lateral deflection as described above is in a single direction and, as such, causes the cutting member 18 to cut into the tubular structure 50 on only one side. In order to cut all the way around the tubular structure 50 the shaft-deflecting device must rotate a full 360 degrees. The shaft-deflecting device 26, as described in detail with reference to FIG. 2, therefore is mounted to a sleeve 54 that is rotatable with respect to the housing 14. The sleeve 54 is rotatably mounted to the housing 14 by bearings 58 and 62. A sleeve-driver 66 rotates the sleeve 54 relative to the housing 14. The sleeve-driver 66 is depicted in the embodiment of FIG. 1 as a planetary gear system or harmonic drive that is coupled to the output-rod 31 of the motor 30. The sleeve-driver 66 in alternate embodiments could be a second motor, such as an electric motor or a hydraulic motor, for example. A hydraulic pump 67 may be provided in the cutting tool 10 to supply pressurized fluid to drive the sleeve-driver 66 in an embodiment wherein the sleeve-driver 66 is a hydraulic motor. In one embodiment, the motor 30 is configured to drive the hydraulic pump 67. Such a hydraulic pump could also provide pressurized fluid to actuate the shaft-defecting device 26 if the shaft-deflecting device 26 is actuatable by hydraulic pressure. Many of the components described above, such as the motor 30, the bearings 42, 46, 58, 62, the sleeve-driver 66 and the shaft-deflecting device 26 have tight tolerances that could be negatively affected by exposure to fluids and contaminants found in a downhole environment and thus could benefit from being sealed from such downhole fluids and contaminants.

The downhole cutting tool 10 is well suited for sealing the tight toleranced components from the downhole environment since the components can be sealed inside the housing 14 with a single rotating seal 70 sealing against the shaft 22. The shaft 22 at this location is laterally deflected, rotated and angled relative to the shaft 22 in an undeflected state and, as such, the rotational seal 70 must be able to accommodate these deflections and rotations. A bellows 74 can flexibly attach the rotational seal 70 to the housing 14 to thereby provide the required flexibility. The bellows 74 could be made of a polymer or a metal, for example, as long as the flexibility is accommodated. A metal bellows 74 may have an advantage in resisting degradation due to exposure to downhole temperatures and caustic fluids as compared to a polymeric bellows 74. Additionally the bellows 74 could balance the pressure from outside the housing 14 with the pressure inside of the housing 14. Optionally, a second bellows (not shown) or a pressure-compensating piston 75 could be employed to balance the pressure inside of the housing 14 with the pressure outside of the housing 14.

The bellows 74 encounters stress that is proportional to the amount of deflection that the shaft 22 undergoes relative to the housing 14. As such, minimizing the amount of deflection can minimize the stress in the bellows 74. Since, movement of the housing 14 within the tubular structure 50 can cause additional deflection of the shaft 22, movement of the housing 14 within the tubular structure 50 should be minimized. A clamping device 78 mounted at the housing 14 that expands radially outwardly to engage with the tubular structure 50 can releasably attach the housing 14 to the tubular structure 50 and thereby minimize movement of the housing 14 relative to the tubular structure 50. This releasable attachment can also prevent rotational and axial motion of the cutting tool 10 with respect to the housing 14 to thereby maintain alignment of the cutting tool 10 to the tubular structure 50 during each successive revolution of the shaft-defecting device 26 during the cutting process. Additionally, the clamping device 78 can center the cutting tool 10 within the tubular structure 50 to aid in creating an evenly distributed cut.

Figure 2:
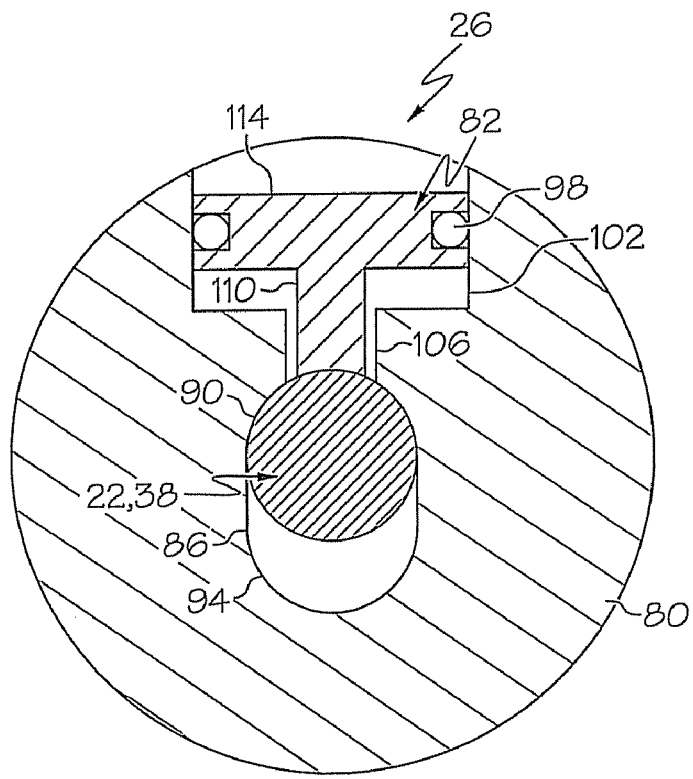
FIG. 2 depicts a cross sectional view of a shaft-deflecting-device disclosed herein.

Referring to FIG. 2, an embodiment of the shaft-deflecting device 26 is illustrated. The shaft-deflecting device 26 includes a body 80 and a hydraulic piston 82. The body 80 has an elongated axial hole 86 with a concentric portion 90 and an eccentric portion 94. The hole 86 is receptive to the portion 38 of the shaft 22 that is flexible. The shaft 22 is not deflected (as shown in FIG. 2) in response to the shaft 22 passing through the concentric portion 90 and the shaft 22 is deflected in response to the shaft 22 passing through the eccentric portion 94. The piston 82 sealably engages via ail o-ring 98 with a laterally oriented first cylindrical port 102 in the body 80. A second cylindrical port 106, smaller in diameter than the first cylindrical port 102 and in axial alignment with the first cylindrical port 102, is receptive of a stem 110 protruding from the piston 82. The stem 110 slidably engages with the shaft 22 and can urge the shaft 22 from the concentric portion 90 to the eccentric portion 94 in response to the piston 82 moving radially inwardly of the body 80. The piston 82 is forced radially inwardly by hydraulic pressure applied to a surface 114 of the piston 82 on a side of the piston 82 opposite a side to which the stem 110 is protruding. By varying the pressure supplied to the piston 82 the shaft 22 can be deflected a variable amount between the concentric portion 90 and the eccentric portion 94 of the hole 86. A hydraulic pump, piping and porting, which is not shown, can supply the hydraulic pressure.

Figure 3:
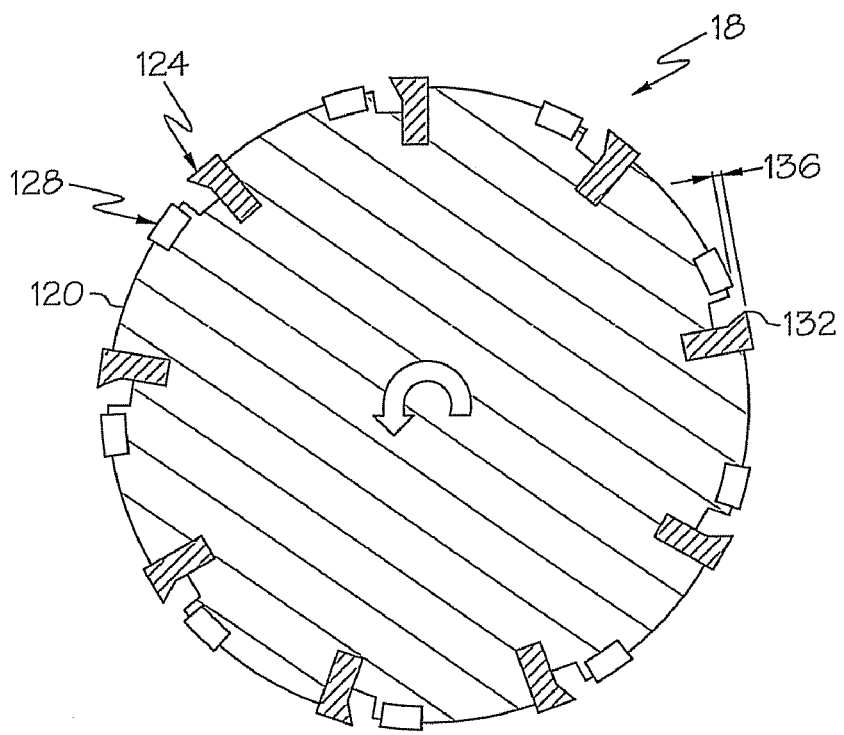
FIG. 3 depicts a cross sectional view of a cutting member disclosed herein.

Referring to FIG. 3, all embodiment of the cutting member 18 is illustrated. The cutting member 18 includes a milling disc 120 with cutting elements 124 and cutting-depth-limiters 128 inserted therein. Optionally, the cutting-depth-limiters 128 and the cutting elements 124 could be integrated into the cutting member 18. To aid in cutting, and minimize tool wear, the milling disc 120 cutting elements 124 and cutting-depth-limiters 128 may be made of a variety of hard materials such as tungsten carbide, ceramic and diamond, for example. Similarly, the milling disc 120, cutting elements 124 and cutting-depth-limiters 128 may be coated to increase their durability with such coatings as a ceramic coating, a diamond like carbon coating and a cobalt alloy coating such as Stellite that is a registered trademark of Deloro-Stellite Corp., for example. Each cutting element 124 has a cutting edge 132 that is positioned radially outwardly of the cutting-depth-limiter 128 that rotationally precedes the edge 132. The radial offset 136 of the cutting edge 132 to the cutting-depth-limiter 128 defines a depth of cut that can be performed with each passing of the cutting edge 132 through the material being cut. This configuration controls the cutting rate, which alleviates the need for tight control over the force with which the cutting member 18 is urged against the tubular structure 50 being cut. This controlled cutting depth also limits vibration amplitudes during cutting that can vary widely based on materials being cut, the rotational speed of the cutter and the like.

Figure 4:
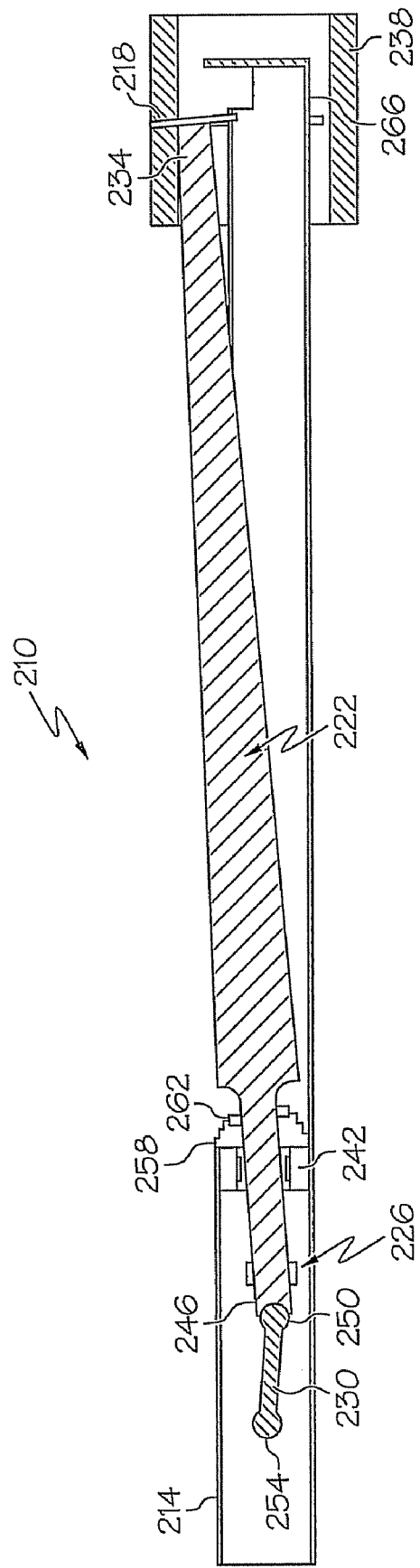
FIG. 4 depicts a cross sectional view of an alternate embodiment of a downhole cutting tool disclosed herein.

Referring to FIG. 4 all alternate embodiment of the cutting tool 210 is illustrated. The cutting tool 210 includes a housing 214, a cutting member 218, a rotatable shaft 222, a shaft-deflecting device 226 and a deflectable driver 230. Unlike the flexible shaft 22 of the cutting tool 10, which can bend over its length, the shaft 222 is rigid and as such remains straight during usage of the cutting tool 210. A first end 234 of the shaft 222 to which the cutting member 218 is attached is deflected to make contact with a tubular structure 238 to be cut by pivoting the rigid shaft 222 about a bearing 242 such as a spherical bearing that can accommodate the shaft 222 passing therethrough at various angles. The shaft 222 is urged to various angles by the shaft-deflecting device 226 that is located on a side of the bearing 242 opposite a side on which the cutting member 218 is located. By locating the shaft-deflecting device 226 closer to the bearing 242 than the cutting member 218, the cutting member 218 is made to deflect further from the cutting tool 210 axes than the deflection of the shaft-deflecting device 226.

A second end 246 of the shaft 222 is coupled to a first end 250 of the deflectable driver 230. The second end 254 of the deflectable driver 230 is coupled to a motor, not shown. The motor drives the deflectable driver 230, the shaft 222 and the cutting member 218. The deflectable driver 230 is configured to rotationally drive the shaft 222 even while the second end 254 is coupled to the motor's output at substantially an undeflected position relative to the cutting tool 210 while the first end 250 is deflected from the central axis of the cutting tool 210 by the shaft-deflecting device 226. The motor, deflectable driver 230, shaft-deflecting device 226 and the bearing 242 can all be sealed within the housing 214 by a bellows 258 that is connected to the housing 214 and to a rotating seal 262 that seals against the shaft 222. The bellows 258 allows the shaft 222 at the location of the seal 262 to be deflected from a nondeflected position while still maintaining seal of the housing to 214 to the shaft 222.

The housing 214 of the cutting tool 210 may include a shield portion 266 that protects the cutting member 218. If such a shield portion 266 is incorporated the shield portion 266 will rotate with the rotation of the shaft-deflecting device 226 such that the shield portion 266 does not interfere with the cutting member 218 during a cutting operation.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A downhole cutting tool, comprising:
   a cutting member mounted on a rotatable shaft;
   a motor in operable communication with the shaft; and
   a shaft-deflecting device in operable communication with the shaft configured to be actuated downhole to deflect the shaft with respect to the motor, the shaft-deflecting device comprising:
      a rotatable body with an axial through hole receptive of the shaft, the through hole being transversely elongated such that a first portion of the through hole is concentric with the rotatable body and a second portion of the through hole is eccentric with the rotatable body; and
      a piston located at the rotatable body and laterally extendable into the first portion in a direction toward the second portion.

2. The downhole cutting tool of claim 1, wherein the cutting member is a disc mill, a grinding disc or a cutting disc.

3. The downhole cutting tool of claim 1, wherein the piston is hydraulically actuable.

4. The downhole cutting tool of claim 1, wherein the piston is variably movable within the rotatable body to thereby variably deflect the shaft.

5. The downhole cutting tool of claim 1, further comprising a second motor to rotate the rotatable body that is separate from the motor in operable communication with the shaft.

6. The downhole cutting tool of claim 5, wherein the second motor is an electric motor.

7. The downhole cutting tool of claim 5, wherein the second motor is coupled to the rotatable body through a gear system.

8. The downhole cutting tool of claim 5, wherein the second motor is a hydraulic motor.

9. The downhole cutting tool of claim 8, wherein the second motor is driven by a hydraulic pump.

10. The downhole cutting tool of claim 9, wherein the first motor drives the hydraulic pump.

11. The downhole cutting tool of claim 1, wherein the motor drives the rotatable body with a planetary gear.

12. The downhole cutting tool of claim 1, wherein the motor drives the rotatable body with a harmonic-drive.

13. A downhole cutting tool, comprising:
    a cutting member mounted on a rotatable shaft:
    a motor in operable communication with the shaft:
    a shaft-deflecting device in operable communication with the shaft configured to be actuated downhole to deflect the shaft with respect to the motor; and
    a sealable housing receptive of the shaft-deflecting device and the motor and sealable to the rotatable shaft.

14. The downhole cutting tool of claim 13, further comprising a first bellows to permit movement between the sealable housing and a seal that is sealable to the rotatable shaft.

15. The downhole cutting tool of claim 13, wherein the housing is filled with a nonconductive fluid.

16. The downhole cutting tool of claim 13, wherein the housing is filled with oil.

17. The downhole cutting tool of claim 13, further comprising a pressure compensation device that equalizes the pressure inside of the housing with the pressure outside of the housing.

18. The downhole cutting tool of claim 17, wherein the pressure compensation device comprises a second hydraulic piston.

19. The downhole cutting tool of claim 17, wherein the pressure compensation device comprises a bellows.

20. The downhole cutting tool of claim 13, wherein the cutting member further comprises:
    at least one cutting element attached to the cutting member; and
    at least one cutting-depth-limiter attached to the cutting member near each cutting element radially inwardly of the cutting element to limit a depth-of-cut of the cutting element.

21. The downhole cutting tool of claim 20, wherein the at least one cuffing element is selected from the group consisting of a tungsten carbide insert, a ceramic insert and a diamond insert.

22. The downhole cutting tool of claim 20, wherein the at least one cutting element has a coating, the coating being selected from the group consisting of a ceramic coating, a diamond like carbon coating and a cobalt alloy coating.

23. The downhole cutting tool of claim 20, wherein the at least one cutting-depth-limiter is selected from the group consisting of a tungsten carbide insert, a ceramic insert and a diamond insert.

24. The downhole cutting tool of claim 20, wherein the at least one cutting-depth-limiter is an integral part of the cutting member.

25. The downhole cutting tool of claim 24, wherein the at least one cutting-depth-limiter has a coating, the coating being selected from the group consisting of a ceramic coating, a diamond like carbon coating and a cobalt alloy coating.

26. The downhole cutting tool of claim 13, further comprising a clamping device that releasably attaches the cutting tool to a downhole tubular structure.

27. A method of cutting a downhole tubular structure, comprising:
    inserting a cutting tool into a downhole tubular structure;
    rotating a shaft of the cutting tool with a cutting member attached thereto;
    deflecting the shaft with respect to a motor in operable communication therewith, with a shaft-deflecting device to thereby laterally deflect the cutting member to cuttingly engage a tubular structure;
    rotating the shaft-deflecting device at least one complete revolution; and
    sealing the shaft-deflecting device from downhole fluids.

28. A method of cutting a downhole tubular structure, comprising:
    inserting a cutting tool into a downhole tubular structure;
    rotating a shaft of the cutting tool with a cutting member attached thereto;
    deflecting the shaft with respect to a motor in operable communication therewith, with a shaft-deflecting device to thereby laterally deflect the cutting member to cuttingly engage a tubular structure;
    rotating the shaft-deflecting device at least one complete revolution; and
    pressurizing a piston to forcibly deflect the shaft.

29. The method of cutting a downhole tubular structure of claim 27, further comprising coupling rotation of the shaft-deflecting device to the rotation of the shaft.

30. The method of cutting a downhole tubular structure of claim 27, further comprising balancing pressure across the seal.

31. The method of cutting a downhole tubular structure of claim 27, further comprising limiting a depth-of-cut per rotation of the cutting tool.

* * * * *